US011625768B2

(12) United States Patent
 Miller

(10) Patent No.: US 11,625,768 B2
(45) Date of Patent: Apr. 11, 2023

(54) INTERNET AUCTION WITH DYNAMIC DUAL-CHANGING PRICING

(71) Applicant: Marc William Miller, Port Ewen, NY (US)

(72) Inventor: Marc William Miller, Port Ewen, NY (US)

( * ) Notice: Subject to any disclaimer, the term of this patent is extended or adjusted under 35 U.S.C. 154(b) by 37 days.

(21) Appl. No.: 17/177,510

(22) Filed: Feb. 17, 2021

(65) Prior Publication Data
US 2022/0261883 A1    Aug. 18, 2022

(51) Int. Cl.
 *G06Q 30/00* (2023.01)
 *G06Q 30/08* (2012.01)
 *G06Q 30/0601* (2023.01)

(52) U.S. Cl.
 CPC ......... *G06Q 30/08* (2013.01); *G06Q 30/0611* (2013.01); *G06Q 30/0641* (2013.01)

(58) Field of Classification Search
 CPC . G06Q 30/08; G06Q 30/0641; G06Q 30/0611
 See application file for complete search history.

(56) References Cited

U.S. PATENT DOCUMENTS

| | | | |
|---|---|---|---|
| 7,433,843 B2 | 10/2008 | Brightbill | |
| 7,447,646 B1 | 11/2008 | Agarwal et al. | |
| 7,627,510 B2 * | 12/2009 | Jain | G06Q 40/06 705/36 R |
| 7,792,723 B2 * | 9/2010 | Molloy | G06Q 30/0633 705/26.8 |
| 8,359,230 B2 * | 1/2013 | Tsiyoni | G06Q 30/0601 705/14.1 |

(Continued)

FOREIGN PATENT DOCUMENTS

| | | |
|---|---|---|
| JP | 2009277207 A | 11/2009 |
| WO | WO-0186478 A2 * | 11/2001 ............. G06Q 30/08 |

OTHER PUBLICATIONS

"Name Your Price—Online Auctions and Reference Prices," by Kashef A. Majid, Andrew Bryant, and Pradeep A. Rau, Journal of Product and Brand Management, 23/6 (2014), pp. 420-428 (Year: 2014).*

(Continued)

*Primary Examiner* — Anne M Georgalas
(74) *Attorney, Agent, or Firm* — Matthew M. Hulihan; Heslin Rothenberg Farley & Mesiti PC

(57) ABSTRACT

Managing an online auction includes maintaining an automatically-decreasing, downward-going purchase price at which prospective buyers of a lot offered for sale can submit an immediate offer, and, concurrent with this, maintaining an upward-going contingent purchase price at which an offer to purchase the lot is to be automatically triggered, contingent on the downward-going purchase price decreasing to the upward-going contingent purchase price. Contingent bid(s) are received and work to increase the upward-going contingent purchase price. Server processing can then be performed based on submission of an immediately-effective offer to purchase the lot at the downward-going purchase price or automatic triggering of an offer to purchase the lot at the upward-going contingent purchase price. Related graphical user interfaces/online auction web interfaces, and presentation thereof, are also provided.

16 Claims, 6 Drawing Sheets

(56) References Cited

U.S. PATENT DOCUMENTS

| | | | |
|---|---|---|---|
| 10,169,811 B2* | 1/2019 | Lee | G06Q 20/102 |
| 2002/0013763 A1 | 1/2002 | Harris | |
| 2003/0041007 A1* | 2/2003 | Grey | G06Q 30/08 705/37 |
| 2003/0050861 A1* | 3/2003 | Martin | G06Q 30/08 705/26.3 |
| 2003/0078871 A1 | 4/2003 | Webb | |
| 2004/0128224 A1* | 7/2004 | Dabney | G06Q 40/00 705/37 |
| 2004/0215550 A1* | 10/2004 | Preist | G06Q 40/04 705/37 |
| 2005/0187856 A1* | 8/2005 | Rabenold | G06Q 40/04 705/37 |
| 2007/0192233 A1* | 8/2007 | Salant | G06Q 40/04 705/37 |
| 2008/0172294 A1* | 7/2008 | McGuire | G06Q 30/0226 705/37 |
| 2009/0012881 A1* | 1/2009 | Popelka | G06Q 30/08 705/27.1 |
| 2012/0323822 A1 | 12/2012 | Wei | |
| 2014/0156438 A1* | 6/2014 | Beavers | G06Q 30/08 705/26.3 |
| 2014/0274262 A1 | 9/2014 | DelaCruz, Jr. | |
| 2015/0356671 A1 | 12/2015 | Wan et al. | |
| 2016/0110803 A1 | 4/2016 | Sakae | |
| 2016/0239908 A1* | 8/2016 | Dolen | G06Q 30/0611 |

OTHER PUBLICATIONS

"A Long Way Coming: Designing Centralized Markets with Privately Informed Buyers and Sellers," by Simon Loertscher, Leslie M. Marx, and Tom Wilkening, Journal of Economic Literature, 2015, 53(4), 857-897 (Year: 2015).*

"Designing a spectrum-auction for maximum proceeds," by Anna-Maria Kovacs, FierceWireless Questex, LLC, Jul. 22, 2013 (Year: 2013).*

Celis, et al., "Buy-It-Now or Take-A-Chance: Price Discrimination Through Randomized Auctions", National Bureau of Economic Research, Working Paper 18590, Dec. 2012, 42 pgs.

Vragov, et al., "Should Online Auctions Employ Dynamic Buyout Pricing Models?", Jan. 2008, 11 pgs.

* cited by examiner

INTERNET AUCTION WITH DYNAMIC DUAL-CHANGING PRICING

BACKGROUND

For the resale of valued personal property, there are currently three basic format structures in place for sales in use on the internet. The first is a traditional 'buy now' structure used on many websites that offer items for sale at a posted price. This structure is most effective for the marketing of pre-packaged items that are mass produced, warehoused, and ready to ship. They are not as effective for used or one-of-a-kind items that do not have an established market price.

The second is an 'English System' auction that utilizes an upward-moving bid price structure for bidders to bid on an item. This format was popularized hundreds of years ago and is commonly known as the 'Old English Auction' structure. Items are typically transported to a central location, stored, cataloged, and then, one-by-one during a live auction, brought out by staff members, displayed, and sold by an auctioneer before the live bidding audience who attends the auction. The buyer picks-up the item and transports it to the buyer's destination. This structure was not designed for application to the internet, is not cost effective or environmentally friendly, and does not take full advantage of technological advances. Various pressures for distanced purchases and sales have highlighted the need for a better alternative enabling the sale and recycle of unique, valued personal property that is not prepackaged and ready to ship from a warehouse.

The third is a 'downward' or 'reverse' auction sales structure. This structure is most effective for obtaining the lowest price for a specified contract or product. Vendors compete to offer the lowest price that fulfills the buyer's posted specifications. It is often used by governmental entities for contract procurement, and is not well-suited for individual, unique items or the resale of valued personal property.

SUMMARY

Shortcomings of the prior art are overcome and additional advantages are provided through the provision of a computer-implemented method for managing an online auction, the online auction including a listing placed and drafted by a seller of a lot for purchase. The method includes maintaining a downward-going purchase price at which prospective buyers of the lot can submit an immediately-effective offer to purchase the lot; automatically decreasing the downward-going purchase price during a time when the online auction remains active. The method additionally includes maintaining, concurrent with maintaining the downward-going purchase price and the automatically decreasing the downward-going purchase price, an upward-going contingent purchase price at which an offer to purchase the lot is to be automatically triggered for provision on behalf of an identified buyer to the seller, contingent on the downward-going purchase price decreasing to the upward-going contingent purchase price. The method further includes receiving one or more contingent bids submitted by a respective one or more prospective buyers of the lot, each contingent bid of the one or more contingent bids indicating a respective contingent price lower than the downward-going purchase price. Based on receiving the one or more contingent bids, the method identifies a contingent bid, of the received one or more contingent bids, indicating a highest contingent price of the received one or more contingent bids, and sets the upward-going contingent purchase price based at least in part on that highest contingent price. Additionally, the method includes performing processing based on (i) submission of an immediately-effective offer to purchase the lot at the downward-going purchase price or (ii) automatic triggering of an offer to purchase the lot at the upward-going contingent purchase price, the automatic triggering being based on convergence of the downward-going purchase price and the upward-going contingent purchase price.

Further, a computer system is provided for managing an online auction, the online auction including a listing placed and drafted by a seller of a lot for purchase. The computer system includes a memory and a processor in communication with the memory, and is configured to perform a method. The method includes maintaining a downward-going purchase price at which prospective buyers of the lot can submit an immediately-effective offer to purchase the lot; automatically decreasing the downward-going purchase price during a time when the online auction remains active. The method additionally includes maintaining, concurrent with maintaining the downward-going purchase price and the automatically decreasing the downward-going purchase price, an upward-going contingent purchase price at which an offer to purchase the lot is to be automatically triggered for provision on behalf of an identified buyer to the seller, contingent on the downward-going purchase price decreasing to the upward-going contingent purchase price. The method further includes receiving one or more contingent bids submitted by a respective one or more prospective buyers of the lot, each contingent bid of the one or more contingent bids indicating a respective contingent price lower than the downward-going purchase price. Based on receiving the one or more contingent bids, the method identifies a contingent bid, of the received one or more contingent bids, indicating a highest contingent price of the received one or more contingent bids, and sets the upward-going contingent purchase price based at least in part on that highest contingent price. Additionally, the method includes performing processing based on (i) submission of an immediately-effective offer to purchase the lot at the downward-going purchase price or (ii) automatic triggering of an offer to purchase the lot at the upward-going contingent purchase price, the automatic triggering being based on convergence of the downward-going purchase price and the upward-going contingent purchase price.

Further, a computer-implemented method is provided that includes presenting a graphical user interface (GUI) to a user. The GUI includes an online auction web interface through which prospective buyers interact with a listing web server. The online auction web interface presents an online auction that includes a listing placed and drafted by a seller of a lot for purchase. The online auction web interface includes a first interface element presenting a downward-going purchase price at which prospective buyers of the item can submit an immediately-effective offer to purchase the lot. The downward-going purchase price automatically decreases during a time when the online auction remains active, and, based on the downward-going purchase price automatically decreasing, the presentation of the first interface element as part of presenting the GUI updates the first interface element as the downward-going purchase automatically decreases to reflect the automatically-decreasing downward-going purchase price. The online auction web interface additionally includes a user-interactive second interface element. The second interface element is configured for selection by the user to submit an immediately-effective offer to purchase the lot. The online auction web interface further includes a user-interactive third interface element. The third interface element is configured for selection by the user to initiate submission of a contingent bid having a contingent price, lower than the downward-going purchase price.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
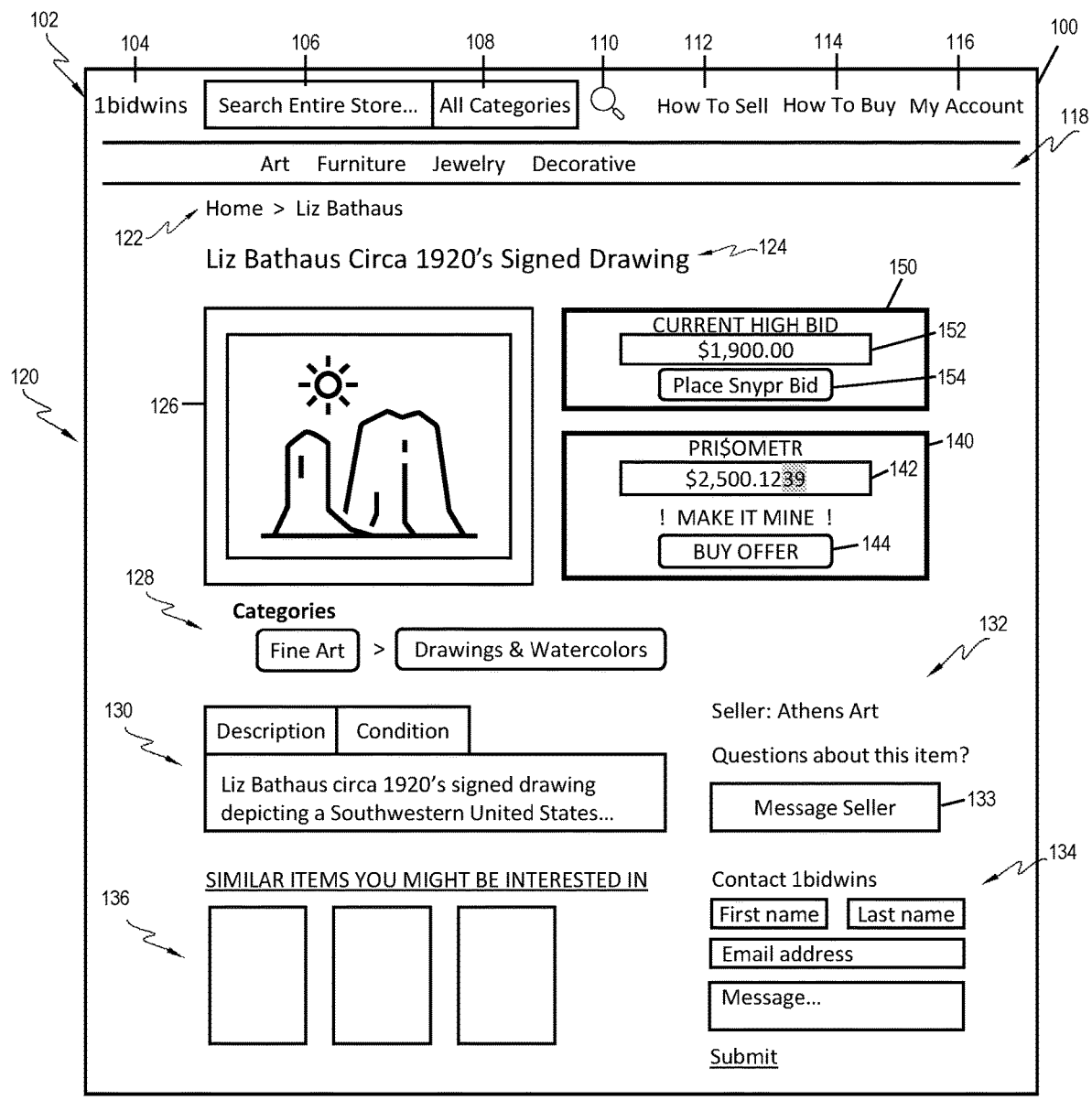
FIG. 1 depicts an example online auction web interface, in accordance with aspects described herein.

Described herein is a web-based auction platform that addresses current economic inefficiencies, reduces natural resource waste, and is safer and more transparent for buyers and sellers, facilitating cost-effective and equitable transactions. An online auction platform is designed for the sale or resale of valued unique property. The platform provides a single auction, hybrid structure encompassing both downward-going and upward-going (dynamic, dual-changing) prices with a buy-now option. Each listing corresponds to a single "lot". A lot is an individual item/object or a set of related items/objects, such as a set of golf clubs. The term "lot" may be used interchangeably herein with the words "item" or "items". Each lot is offered as a separate sales offering with an upward-going auction aspect and downward-going auction aspect that simultaneously compete. The downward-going auction aspect includes a continuously (i.e. on a regular interval) and automatically declining price that decreases as time passes and is displayed (as a "pri$ometr") on the auction listing page. This downward-going purchase price is a price at which an immediately-effective and acceptable buy-now offer to purchase the lot can be submitted at any moment by a prospective buyer who makes a selection, such as by clicking a button, in the online auction web interface. An immediately-effective offer to purchase the lot by that prospective buyer at least temporarily halts the sales offering and freezes, at least temporarily, the decrease of the downward-going purchase price at whatever the price was when the buy-now offer was submitted. That current price offer is presented to the seller who can accept the offer or, in some embodiments, could decline the offer. Various reasons may exist why the seller would decline the offer, for instance based on poor buyer rating, lack of buyer reliability, an unverified payment means, or because the seller wishes to re-offer the lot when market conditions improve.

The downward-going price can decrease across the full duration of the listing, which may be several days or more, or across a different, shorter, timeframe. In one example, the auction starts with the downward-going price at a starting price and ends when the downward-going price reaches some ending price predefined by the seller or the auction platform. During this time, the price decreases steadily. Additionally or alternatively, the auction can have a set duration of any number of minutes, hours, days or weeks, and the downward-going price decreases across that duration of time at a set dollar amount or percentage of the price, and at a given frequency. Thus, in contrast to a conventional "buy now" site where, if no one accepts the indicated price, the item/lot offered at the set price can linger on that site indefinitely, aspects discussed herein adjust the buy-now price downward, automatically, over time, which moves the buy-now price to a level the market will eventually accept and that no longer relies on multiple interested and competing potential buyers.

The timed, declining price structure is simultaneously coordinated and competes with an upward-moving "private bid" option, referred to herein as a contingent, or "snypr", bid option. A contingent bid option allows prospective buyers to submit a contingent bid and have a corresponding offer placed only if and when the downward-going purchase price automatically decreases to a price-point that the contingent bidder indicates, via the contingent bid, that the buyer is willing to pay. A contingent bid indicates a contingent price—the price that bidder is willing to pay if the downward-going purchase price decreases to that amount. An offer to purchase the lot springs from a contingent bid based on the contingency that the downward-going purchase price decreases to the contingent price indicated by the contingent bid. Thus, presentation of the offer is contingent on no other prospective buyer exercising the buy-now option to buy the lot at the downward-going purchase price prior to that downward-going purchase price decreasing to the upward-going current contingent bid price point. In this manner, a prospective purchaser has the option to offer to buy the lot immediately at the then-current downward-going purchase price (the pri$ometr-displayed price, which automatically decreases over time), or leave a contingent bid at a lower price point and taking the chance that the downward-going price will decrease to the lower price point of the contingent bid before someone else invokes the buy-now option or submits a higher contingent bid price. Once the downward-going purchase price and the upward-going contingent purchase price converge, an offer on behalf of the bidder who submitted the winning (highest) contingent bid is automatically triggered for provision, and a buy-now offer at the now-converged prices is no longer available as an option unless the seller rejects the offer made on behalf of the bidder who submitted the winning contingent bid. In the event of such a rejection, the auction could resume with the pri$ometr unfreezing to re-commence decrease of the buy-now price.

Each contingent bid includes/indicates a contingent price. The contingent price is a private offer price at which an offer to the seller, on behalf of this contingent bidder, will be triggered automatically if that downward-going price declines to that contingent price. Because different prospective buyers can submit contingent bids at increasing price points, the system maintains an upward-going contingent purchase price based on the submitted contingent bids. Each of the snypr bidders take a risk in that even the highest contingent bid price offered in the upward-moving contingent purchase price may not win, i.e. if someone else offers the buy-now price displayed on the pri$ometr before an offer based on a contingent bid is triggered. Meanwhile, a contingent bidder might be outbid by another contingent bidder submitting a higher contingent price, which drives up the upward-going contingent purchase price.

The buy-now option at the declining price shown on the pri$ometr competes with the upward-going contingent purchase price driven by various upwardly-moving contingent bids until they converge and one preempts the other. These potentials dynamically compete to produce a new single-sale structure, where placing an offer at the posted price can preempt all contingent bid offers, stopping the lot's offering at any moment before it is won by one of the contingent offer bidders.

The structure creates a dynamic between an upward-moving auction bid process and a downward-moving auction bid process, in which they are merged into a new, synchronized, and more efficient market potential than either system provides individually. The ability for a buyer to immediately end a sales offering, ahead of the upward-moving price bid trajectory, by electing the buy-now offer at the current downward-going purchase price creates a far more dynamic and efficient market potential. This structure is more transparent than conventional practices and eliminates buyer concerns about being "bid up" with illegitimate "competing bids", while addressing issues with secret reserves (seller-set reserve minimum price at which the lot is to be sold) and other inefficiencies prevalent in the auction world. This structure is more efficient, transparent, and cost effective, and is particularly useful for selling both valued items of personal property, such as home furnishings, décor artwork, and jewelry, and real estate to remote prospective buyers over the internet.

In some embodiments discussed further herein, both (i) the downward-going purchase price and (ii) an upward-going contingent purchase price can be displayed on the online auction web interface for prospective buyers to see. This enables them to visualize the dynamic and opposing structure of simultaneously offering the potential for a would-be buyer to stop the lot auction by activating the buy-now option at the then-current downward-going purchase price displayed on the pri$ometr.

Because each lot is its own individual auction offering (i.e. as opposed to part of a larger lot sale), this avoids sellers having to ship lots to a central location for cataloguing and joining to a larger auction offering. This is more convenient for the buyers, saves substantial overhead and expense for both buyers and sellers, and provides a cost-effective, safer (less need for direct human interaction than a gallery sale), more energy-efficient, and less labor-intensive option. Furthermore, the seller is more secure because the seller controls the creation and description of the seller's offering, and the valued lot remains in the seller's possession and custody until sold (lowering costs and the potential for damage). From a buyer's perspective, the system is more convenient and transparent than a traditional English or Dutch style auction-based sales process. There is no requirement to wait for the sale date and then wait further during that day for the larger auction sale offering to be conducted and progress, where each lot is offered sequentially and consumes potentially hours of time. In contrast, the online auction platform provides that an individual lot sale can end at any time when a buyer invokes the buy-now option at the then-current pri$ometr price and the seller accepts the offer. Alternatively, if there is little or no interest in the lot and/or this downward-going price gets too low for the seller to accept before a buyer selects the buy-now option, the seller can simply remove the offering. If the seller no longer wishes to sell the lot, it can be taken down; in that case, there was no secrecy or untruthful bidding-up of the price during the live auction, in contrast to what commonly occurs today in existing online auction systems.

In accordance with some aspects, the online auction platform provides for an online auction web interface. Such an interface can be presented to a user as part of a graphical user interface on a computer or computing device, such as a PC, laptop, or mobile device (smartphone, table, smartwatch, etc.) as examples. The interface is presented to buyers and sellers, though the interface can vary depending on whether the user is a buyer or seller. The interface is a client-facing frontend to a backend hosted by server(s) that send communications to buyers and sellers and receive communications from buyers and sellers. The auction interface/GUI is an example of data that is communicated. Also communicated are bids, buy-now selections, offers, acceptances, and rejections, among other communications. Bids and buy-now invocations are communicated across the internet from a client to the backend server(s) via an auction interface presented in a web browser or mobile application, as examples. An offer may be communicated from the server(s) to a seller (i.e. seller's computer system) via any desired communication channel, such as email, text messaging, via a mobile device application and/or via a web browser, as examples. Acceptance of an offer or rejection of an offer can be communicated similarly from the seller (i.e. seller's device) to the server(s), and from the server(s) to the buyer (i.e. buyer's device) on behalf of whom the offer was presented to the seller.

FIG. 1 depicts an example online auction web interface, in accordance with aspects described herein. The interface 100 may be presented as part of a web page rendered by a web browser or as part of a mobile application on a mobile device, for instance.

Interface 100 includes a plurality of interface elements, such as buttons, links, text boxes and elements, labels, fields, graphics, and other types of elements. Some such elements are interactive in that a user can interact with the element to, e.g., input or submit information or data, or to navigate around the interface, for instance to another screen or module thereof. Interface 100 includes a header portion 102 displaying a site title ("1bidwins") 104, a search/query input box 106 for searching the 1bidwins store for offered lots, a category selection interface 108 for selecting one or more categories to search, search execution ("go") button 110, and additional links 112, 114 and 116 to navigate the interface to How to Sell, How to Buy, and user Account information pages, respectively. The My Account portion could be to register for an account as a buyer and/or a seller, or to view, edit or verify account details, such as user profile information and payment information.

Beneath header portion 102 are category shortcuts 118 for Art, Furniture, Jewelry, and Decorative categories, selectable by the user to jump to a listing of current offerings (lots) for sale within the selected category. The category shortcuts could, if desired, present all categories. In a particular example, listed as only categories in which the particular user has previously expressed an interest and/or browsed in the past.

Below the category shortcuts 118 is the listing 120 that presents a live (not yet ended or cancelled) listing for a lot on which prospective buyers can bid. The particular lot in this example is a signed painting by a famous artist, Liz Bathaus. Breadcrumb-style navigation path 122 indicates that a search for artist "Liz Bathaus" has been applied from a Home page (for instance a Home page for the "Fine Art" category). Listing title 124 presents a title of the listing. Element 126 presents a picture of the item. 128 presents a categorization of the listing, where here the listing is categorized within the "Drawings & Watercolors" sub-category of the "Fine Art" category. Below this is a Description and Condition interface 130, with respective "Description" and "Condition" tabs for displaying a text description of the lot and a condition description of the lot. Seller information 132 indicates the seller name ("Athens Art") and a button 133 to invoke a message interface for the user/viewer of this interface 100 to send a message to the seller. Interface 134 is a contact interface for contacting the site operator 1bid-wins. Interface 136 presents a side-scrolling 'similar items' listing of live auctions in which the user/prospective buyer viewing this interface might be interested.

Pri$ometr interface 140 indicates the downward-going purchase price as field 142. In this example, the current price is presented in United States dollars. The precision at which this price is presented could vary to any desired number of decimal places, zero or more. Here, the precision is to the one-hundredth of a penny/cent—four decimal places—with the last two decimal places highlighted, as shown. It is understood that any sale could round up or down to the nearest penny or dollar. The interface 140 includes a user-interactive (e.g. clickable/selectable) button 144 that a user can select to submit an immediately-effective buy-now offer to purchase the lot at the then-current (and displayed) pri$ometr price.

Contingent ("snypr") bid interface 150 indicates the upward-going contingent purchase price in field 152, and a user-interactive (e.g. clickable/selectable) button 154 that a user can select to submit a contingent bid. Submission of a contingent bid includes entrance or selection of a contingent price by the bidder and a click or other selection to electronically send the bid in the form of data to the auction platform server(s), for instance as a communication across the internet.

In this example, the upward-going contingent purchase price is openly displayed in the listing, meaning anyone who views the listing, regardless whether they have or will submit any contingent or buy-now bid, can view this upward-going contingent purchase price. In other examples described herein, the current upward-going contingent purchase price is not viewable unless and until a user selects (e.g. button 154) to submit a contingent bid. The interface may then present the current high bid price (upward-going contingent purchase price) as a way of informing the user of the price that user's bid must beat in order to overtake that current high bid. In examples where the upward-going price meets or exceeds a minimum sale price set by the seller, i.e. a seller-set reserve minimum price at which the lot is to be sold, the display of this upward-going contingent purchase price can vary according to whether that price meets or exceeds the seller-set reserve bid. In some examples, the color of this price as presented in 152 changes from one color to another if/when the current high bid meets or exceeds a seller reserve, in order to indicate that that the reserve has been met. If the current high bid 152 is below the reserve price, the display can retain its original display color, and then change to a different color if the current high bid is at or above the reserve. Optionally, when a contingent bidder enters a contingent bid the color may or may not change depending on the price that the contingent bidder enters as the contingent price, thereby informing the bidder whether the contingent price exceeds the reserve.

At any point when the downward-going purchase price (142) decreases to the upward-going contingent purchase price, that sale offering can halt or end, e.g. with automatically triggering provision of an offer to the seller on behalf of the buyer who submitted the then-current upward-going contingent purchase price. The offer can be provided electronically to the seller for acceptance or rejection via an electronic communication from the seller to the auction platform server(s).

The upward-going contingent purchase price itself presents a competition between contingent bidders, but with a dynamic and opposing structure in which the lot is simultaneously offered for immediate purchase by any would-be buyer who activates a buy-now offer to buy at the then-current pri$ometr price. A buyer can therefore preempt an offer that would otherwise spring from the highest contingent bid in the event the visibly decreasing downward-going purchase price were to decrease to the current high snypr bid 152. A buy-now offer could stop the auction and take the lot ahead of the upward-going contingent purchase price and the decreasing downward-going purchase price otherwise converging.

In some embodiments, no contingent purchase price or contingent bid details are revealed to a seller until any offer springing from the contingent bid is made, i.e. the pri$ometr decreases to converge to the winning contingent purchase price. Contingent bidders (and buy-now buyers) may be required to be fully registered with the online auction platform, with an account and profile, and possibly with verified or authorized billing/payment means, such as credit card information, for any offer to be submitted and/or bid to be submitted by or on behalf of that buyer. In some embodiments, contingent bidders can select in the interface to be notified by email, text, mobile app notification, browser notification, or any other communication channel when another contingent bidder has submitted a higher contingent bid (i.e. with a higher contingent purchase price).

In embodiments, any offer (a buy-now offer or an offer triggered from a contingent bid) is submitted to the seller and that seller has the right to accept the offer or decline the offer. If a bidder's offer is declined, the bidder may incur no cost or charges. Optionally, the seller might be assessed some costs and charges, pursuant to any terms agreed-upon with the auction provider.

In specific examples, a listing for a lot is described and priced for sale by the seller and is offered on the platform as an active listing for some duration of time, for instance 30 to 45 days. Each such listing is for a single lot. The seller can be obliged to agree that he or she guarantees the lot is as described. Meanwhile, the buy-now price is lowered incrementally while the listing is active—possibly in relatively small increments such as one-thousandth of a penny—per unit of time, and this decrease is displayed digitally such that potential purchasers viewing the listing see the offering's price decline. The decrease can occur according to a pre-established function, e.g. a mathematical formula, that is based on (at least) passage of time. In a particular example, the decrease is a fixed amount of money per second and is based on a parameter set by the seller. The seller might specify a total percentage price decrease (for instance 40%) to occur over the course of a fixed number of days, say 30. The decrease could be linear or logarithmic, as examples. In some examples, the decrease occurs at a frequency of at least once per second (at least one decrease in price per second). The decrease could be several times, possibly even tens or hundreds of times per second. The downward-going purchase price is displayed in the online auction interface and is updated (refreshed) at that frequency or faster, to thereby reflect each such decrease in the downward-going price.

Additional optional features include a closed messaging system for queries and responses to be exchanged regarding the lot. If a potential purchaser desires an item and is happy with the current downward-going price, the purchaser can select the buy offer button (144) and the system will automatically generate and communicate an offer by message to the seller, who then can accept or reject the offer. The period for valid acceptance or rejection may be time-limited, and defaulted (for instance to "reject") if the seller fails to respond within a set period of time. Additionally or alternatively, a prospective purchaser could select to submit a secret contingent bid that can be automatically placed (in the form of a triggered offer to the seller) only if and when the buy-now (downward-going) purchase price has dropped to the price set by the prospective purchaser as part of the contingent bid. A prospective buyer who chooses to utilize the contingent bid option can be notified if/when that prospective buyer's bid is surpassed. If another prospective buyer elects the buy-now option (by definition at a higher price than the upward-going contingent purchase price) that is accepted by the seller, then no contingent bid-based offer is generated and provided to the seller.

If an offer is accepted by the seller, then the buyer's total cost and payment for the lot can include the purchase price plus applicable sales tax and a buyer premium of some fixed amount or percentage of the purchase price (as examples). The buyer's payment can be held in escrow. The seller can then be instructed to ship the lot to the buyer. After receipt of the lot and inspection by the purchaser, the purchaser can indicate acceptance of the lot and the system can submit the escrowed payment or a portion thereof to the seller for the lot. Optionally, a seller commission can be automatically taken from the escrowed money.

In some examples, a purchaser has some fixed amount of time, for instance seven days, after receiving a lot to notify the auction platform if a lot is not satisfactory. In this event, the escrow hold on the buyer payment can continue until the lot is returned to seller and is verified to be in the same condition as when it was shipped by the seller to the purchaser. Then, upon receipt by the seller of a returned lot in the same condition as it was shipped, the escrow amount, optionally less an escrow and/or restocking fee, can be returned to the buyer.

As noted, if no purchaser has made an offer to buy the lot and the price has dropped below what the seller considers to be an acceptable price as indicated by the seller reserve, the seller can stop and cancel the offering, and possibly relisted at a later time.

The auction structure could be used for the sale of personal property (as presented in examples herein) or real estate. Escrow in such a real estate sale could be under the control of title insurance companies. This can result in less work overall for realtors and may involve only one realtor in any real property transaction. This structure could reduce the time a property is on the market, create more liquidity in the marketplace, and lower transaction costs as compared to customary costs.

In an additional or alternative embodiment to some described herein, an auction lot is real property (i.e. land, potential with structure(s) built thereon). As described elsewhere herein, convergence of the buy-now price with the upward-going contingent purchase price at a price point can trigger the automatic provision of an offer on behalf of that highest bidder to purchase the lot at that price point. In this scenario, the process proceeds as described herein, with the seller being presented an offer that the seller can accept or reject. In some examples, this offer that is triggered by the convergence could be regarded as provisional or contingent, and subject to a bid-off as described below. Then if the bid-off ends without producing a higher bid for the seller, this original offer that was triggered by the convergence is converted from a provisional offer into a non-provisional offer that is acceptable or rejectable by the seller at that point.

As an alternative to provision of an offer upon convergence of the downward and upward going prices (or in the event that the triggered offer is provisional), the convergence triggers a bid-off between a set of prospective purchasers. Whether to trigger a bid-off could be configurable by a seller or the auction platform. It could be based on a selection made by the seller when creating the auction, i.e. a selection that a bid-off should be held or might be triggered if certain conditions are met. Alternatively, whether to have a bid-off could be set as a default depending on the type of lot; the default for a real estate lot auction could be that a bid-off is triggered by the convergence. Alternatively, whether the convergence triggers a bid-off could be based on some other factor, for instance when the winning (highest) contingent bid was submitted in relation to the time of convergence. In this situation, a determination can be made whether the winning contingent bid was submitted within some configuration timeframe, for instance 1 hour, of the convergence between the downward-going and upward-going prices. If so, this could trigger a bid-off. Otherwise, no bid-off is triggered and instead an offer to the seller for that winning contingent price is automatically triggered for provision or converted from provisional to non-provisional. Triggering a bid-off when the winning bid was received within some timeframe of convergence may be advantageous to avoid or address situations in which a bidder submits a last-minute or last-second bid that overtakes an otherwise winning bid. It may be undesirable to allow a bidder to overtake the a current high-bidder in the last seconds or minutes of an auction. Thus, if the winning bid is received within some configurable amount of time prior to convergence of the upward-going and downward-going prices of the auction, then a bid-off could be triggered.

A bid-off may be limited in duration and limited in who can submit bids. When a bid-off is triggered, this triggers countdown of a timeframe, for instance 48 hours, during which some or all previous bidders (e.g. contingent bidders who submitted a contingent bid for this auction), including the then-current high contingent bidder who submitted the contingent bid at the price point of convergence, could be notified of the prospective offer and sale at that price point and invited to place another, 'final' offer price higher than that price point. In some embodiments, the pool of bidders invited/allowed to submit a bid as part of the bid-off may be limited. In one example, the pool is limited to the bidders who submitted the highest contingent bids, where "highest" is defined to be the last n number of bids, n>1. The latest bids are by definition the highest bids received, as any contingent bid is accepted only if it outbids the then-current high contingent bid.

In any case, the bid-off continues for a duration of time during which the previous bidders who were invited to submit a final bid can do so. If no other higher bid (higher than the price at which convergence occurred) is received during that timeframe, then, as described above, an offer can be conveyed to the seller (if it wasn't already conveyed) on behalf of the then-current high contingent bidder, who is also the bidder who submitted the contingent bid at the price point of convergence. If instead one or more notified bidders submits a higher bid than the current price point, then the sale can proceed in any desired fashion. For instance, the highest bid of all bids submitted during the timeframe could be regarded as the winning bid and trigger an offer of that amount to the seller on behalf of the highest bidder.

An embodiment in which convergence of the buy-now and upward-going prices instead triggers a bid-off between contingent bidders, could be particularly advantageous when the lot is, or includes, real property. A real property owner could sell his or her home and then, once the transaction is firm, optionally utilize the auction platform again to sell personal property/contents in a simple-structured and less-stressful manner.

A seller of real property, as part of the auction listing set up for a real property sale, might be required to provide documentation and reports related to the property, which might include a preliminary title insurance report for the property, a municipal code compliance report from the municipality where the property is located evidencing code compliance and building violations, an appraisal from a lender approved appraiser, surveys, and any other desired or required documentation. The costs of these items, to the extent customarily incurred by a purchaser, may ultimately be recouped to the seller in most scenarios as part of the option cost protocol or fees paid by the purchaser on termination of an offer or in the adjustment of funds process for the closing.

The real property could be listed with appropriate description. Then, in some scenarios, an accommodating realtor could be selected to work with the seller, accommodate viewing requests, and disseminate information to prospective buyers.

In some scenarios, the highest offer received during a bid-off could be submitted to the seller to accept or reject. In the event of acceptance, the winning prospective purchaser could be required to pay a certain percentage of the purchase price into escrow and be granted a unilateral option agreement which would give them the exclusive right to purchase the subject premises for a set period of time. During this period of time, the optionee/purchaser could coordinate his or her own independent due diligence and finances. The money paid into escrow could be held pending sale or termination of the transaction. In the event of a purchase, the escrow funds could be applied to the purchase price and closing costs. In the event of cancellation by the purchaser certain portions of the escrow deposit would be returned to the purchaser, based upon the passage of time. The non-refundable portions of the escrow could be paid over to seller/utilized to defray seller costs, including carrying costs and fees incurred. The longer the period of time that purchaser chooses and ties up the property prior to cancellation, the larger the non-refundable portion becomes.

The instant use of a simple, unilateral option and purchase structure as described above simplifies a real estate sales transaction by utilizing a simple standard set of equitable terms in accord with local practice.

Some benefits of this protocol are highlighted as follows:

1) All real estate brokers are not equal in terms of knowledge and skill, and tastes vary. It is hard for brokers to set valid listing value for many homes and the competition between brokers to obtain exclusive listing incentivizes some agents to be overly generous with their estimates of potential value in order to lock up the listing contract. Even though that unrealistic listing price often causes properties to linger on the market to the detriment of the owner, until they are slowly brought down to reality understanding the market value and gradually required to reduce the unrealistically-high listing price. This issue is eliminated in accordance with aspects described herein since the market determines the price.

2) The protocol discussed herein also eliminates the potential issues if a broker sets too low a listing price, either intentionally or inadvertently. The market establishes the best price.

3) In accordance with aspects described herein, offers will be generated within an understood period of time and the length of time on the market will be reduced significantly, thereby lending market liquidity and preventing some properties from lingering without offers for extended periods of time due to the unrealistic price that might have been attached during the listing process. A lot of money will be saved.

4) In accordance with aspects described herein, both buyer and seller are more educated, better protected, and more equitably positioned from the outset a coherent, smoother and far less cost-intensive transaction. This structure vastly reduces the potentials for abuse. This is a simpler, less stressful, quicker and far more transparent method for buying or selling a home and it coordinates a timely simple methodology for selling the valued home furnishings and décor as the sale date approaches This protocol establishes a market structure for sales that is vastly lowers the transactional costs, is more transparent, quicker, less stressful and safer for all parties.

It is understood that the online auction platform could be hosted on and served by backend server(s) to client computer systems of the prospective buyers and sellers. The server(s) can manage online auctions in accordance with aspects described herein, which includes sending and receiving electronic communications to/from buyers and sellers. Such communications can be browser-based communications and/or mobile application based communications, notifications, text messages, and/or emails, as examples.

Aspects described herein present processes/methods for managing an online auction. Example such processes for managing an online auction in accordance with aspects described herein is presented by FIGS. 2A-2C. In some examples, the process is performed by one or more computer systems, such as those described herein, which may include one or more computer systems hosting an online auction platform, such as one or more cloud servers, and/or one or more other computer systems. It is noted that some aspects of FIGS. 2A-2C can be performed concurrent with each other and/or in a different order than indicated.

Initially, the online auction can include a listing that is placed and drafted by a seller of a lot for purchase. "Lot" refer to an item or set of related items sold together in a single offering. The method includes maintaining (202) a downward-going purchase price (e.g. a buy-now price) at which prospective buyers of the lot can submit an immediately-effective offer to purchase the lot. An immediately-effective offer is one that is immediately capable of being accepted by a seller once notified of the offer. This is in contrast to the placement of a contingent bid by a prospective buyer, in which the contingent bid does not immediately produce an offer that can be accepted; instead, an offer may eventually from the contingent bid, as discussed herein. The process also includes automatically decreasing (204) this downward-going purchase price during a time when the online auction remains active. It is noted that the time across which the decrease occurs may or may not correspond to the entirety of the auction listing. It may cease decreasing (at least temporarily), and potentially resume thereafter, for instance. Alternatively, the decrease may begin automatically only after some amount of time has passed after the auction goes live.

Automatically decreasing the downward-going purchase price can include decreasing the downward-going purchase price according to a pre-established function that is based (at least in part) on passage of time. The function may also incorporate listing parameters such as starting price and/or listing duration, as examples. In some embodiments, decreasing the downward-going purchase price according to the pre-established function includes decreasing the downward-going purchase price at a frequency of at least once per second, and the downward-going purchase price is displayed in an online auction graphical web interface and updated at that frequency (or faster) to thereby reflect each such decrease in the downward-going purchase price.

Figure 2A:
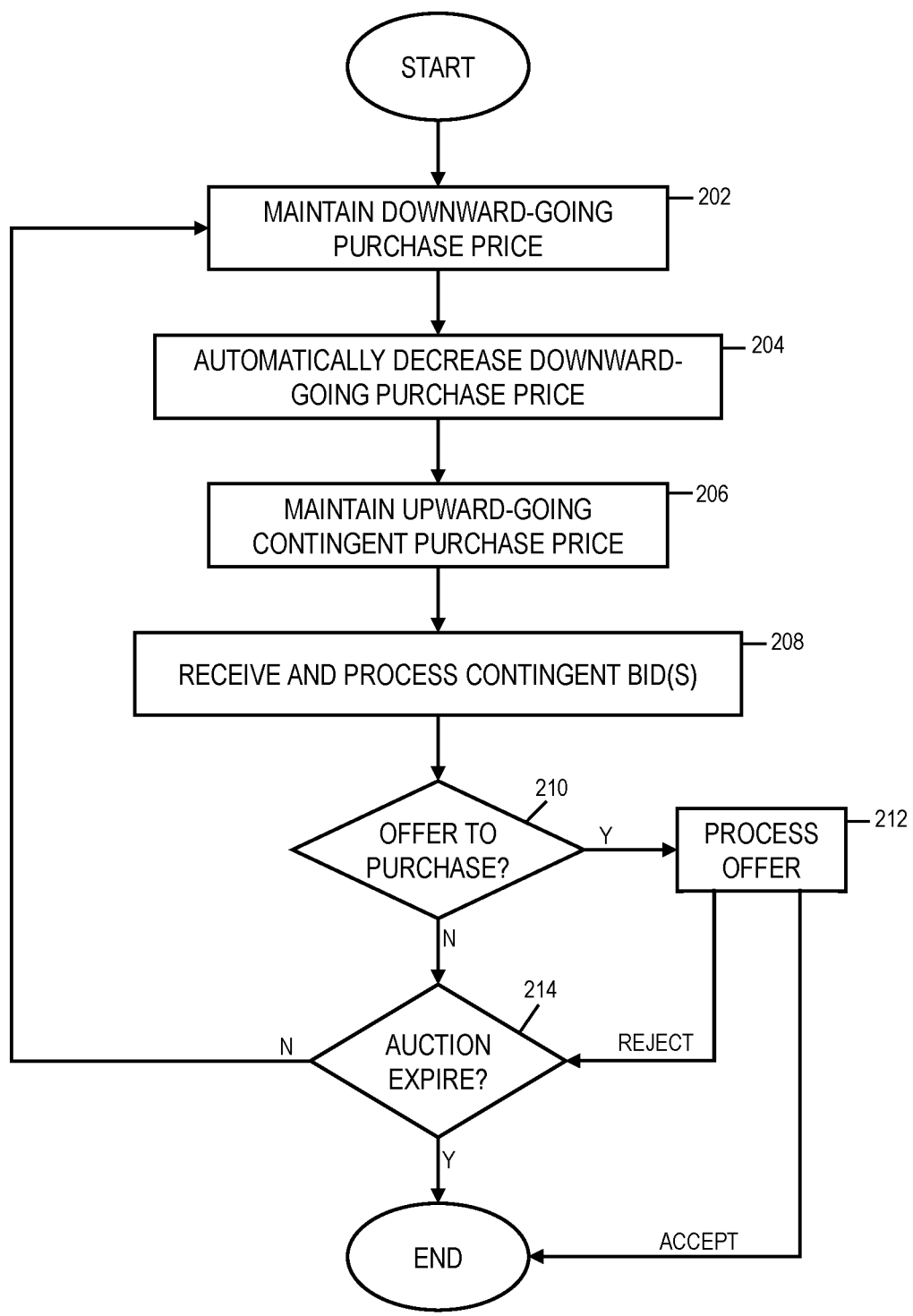
FIGS. 2A-2C depict example processes for managing an online auction, in accordance with aspects described herein.

Continuing with FIG. 2A, the process also maintains (206), concurrent with maintaining the downward-going purchase price (at 202) and automatically decreasing the downward-going purchase price (at 204), an upward-going contingent purchase price (e.g. snypr/current high bid) at which an offer to purchase the lot is to be automatically triggered for provision on behalf of an identified buyer to the seller. This upward-going purchase price is characterized as being contingent because it is contingent (in terms of whether presented in the form of an offer to the seller and in terms of it potentially being surpassed by way of another contingent bid) on the downward-going purchase price decreasing to the upward-going contingent purchase price. In this regard, the offer on behalf of that identified buyer to purchase the lot may not actually be triggered, for instance if a buyer invokes the buy-now option and the seller accepts, or if the buyer is outbid by another contingent bid.

The process also includes receiving and processing (208) contingent bid(s) submitted by respective prospective buyer(s) of the lot. Each such contingent bid indicates a respective contingent price that is lower than the downward-going purchase price (at least at the time the contingent bid is submitted). A contingent bid is characterized as 'contingent' because there is a contingency that must be met (i.e. the downward-going purchase price must decrease to a contingent purchase price) for an offer to be triggered to the seller based on that contingent bid.

The contingent price of a contingent bid reflects a contingent purchase price that bidder is submitting as part of that contingent bid. The seller could later submit another contingent bid indicating an even higher contingent price, if desired. If a submitted contingent bid indicates a contingent price that is highest of any submitted contingent bid, this causes an increase in the upward-going contingent purchase price. The updated contingent purchase price may be increased to match the contingent price of that highest contingent bid, as explained with reference to FIG. 3. Thus, based on receiving contingent bid(s) over some amount of time, the contingent bid with the highest contingent price is identified and the upward-going contingent purchase price is set based on that highest contingent purchase price. Further details of contingent bid handling are described with reference to FIG. 3.

Figure 3:
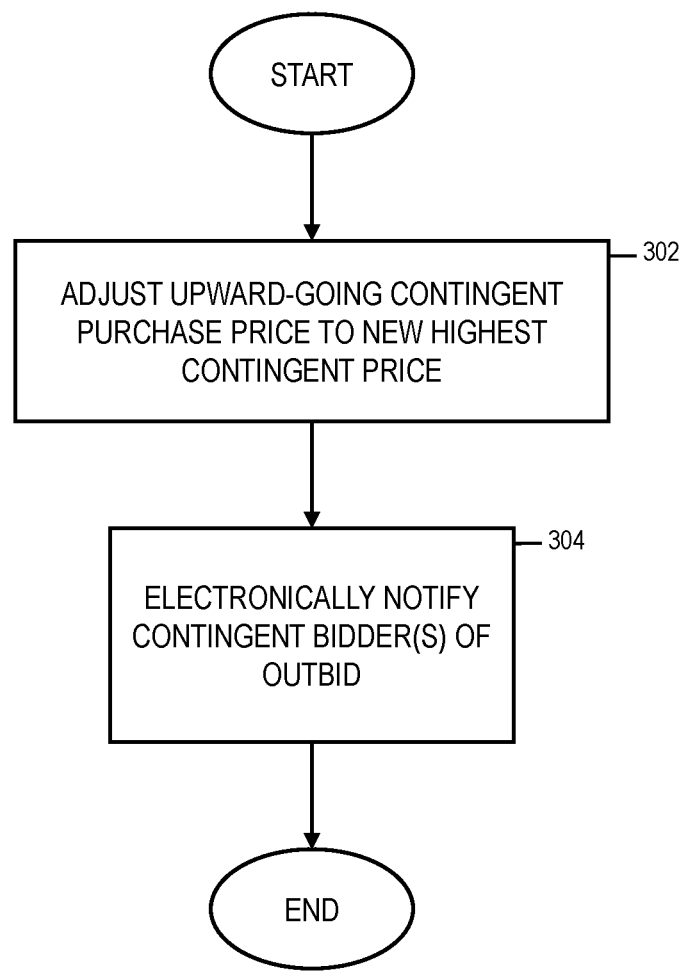
FIG. 3 depicts an example process for processing a submitted contingent bid, in accordance with aspects described herein.

Specifically, FIG. 3 depicts an example process for processing a submitted contingent bid, in accordance with aspects described herein. The process proceeds in the same manner regardless of whether the contingent bid is the first contingent bid submitted for a listing or a subsequently-received contingent bid. It may be assumed that no contingent bid is accepted unless it necessarily indicates a contingent price that is higher than the then-current upward-going contingent purchase price when the bidder attempts to submit the contingent bid. Thus, in the processing of FIG. 3, it is assumed that the contingent bid being processed indicated a contingent price that is higher than all other previously-submitted contingent bids.

The process proceeds by adjusting (302) the upward-going contingent purchase price from the existing highest contingent price to the new highest contingent price indicated by this incoming bid. If this is the first submitted contingent bid, the 'existing highest' contingent price is defined to be zero and thus the upward-going contingent purchase price is adjusted to be this one and only submitted contingent price. If this is not the first submitted contingent bid, then the upward-going contingent purchase price is adjusted to this new highest contingent purchase price.

By way of specific example, assume that an auction has begun and that the first contingent bid submitted by bidder 1 indicates a contingent price of $20. Upon receiving this first contingent bid, the process of FIG. 3 identifies the contingent price of $20 as being the highest of all other contingent bid(s) that has/have been submitted to that point as no other contingent bids have been submitted and the process therefore adjusts (or initially sets) the upward-going contingent purchase price to be $20.

If a second contingent bid, submitted by bidder 2, indicates a contingent price of $35, then the process of FIG. 3 would then be invoked, and the upward-going contingent purchase price would be adjusted at 302 to $35.

If, when a contingent bid is submitted, this causes an adjustment in the upward-going contingent purchase price (i.e. proceeding after 302), then interested contingent bidder(s) can be electronically notified at 304. This may not be applicable to the first adjustment of the upward-going contingent purchase price (i.e. based on a first submitted contingent bid) as there may be no other prospective or actual contingent bidders yet involved in the auction. But on subsequent contingent bids—ones that outbid at least one prior contingent bidder—the process could electronically notify 304 other contingent bidder(s) of being outbid. For instance, if bidder A was the first contingent bidder at $20, bidder B was the second contingent bidder at $35 and now bidder C submits a contingent bid of $40, then the process at 304 could notify bidder B (and optionally also bidder A and any other prior contingent bidders) that they have been outbid.

Thus, if at any point a contingent bid with a contingent price exceeding the then-current upward-going contingent purchase price, P, is received, then the bidder who previously submitted the contingent bid at price P could be notified of being outbid (304) (and optionally any other users/bidders could be notified of the new upward-going contingent purchase price) to assess whether to submit another contingent bid.

It is seen that the upward-going contingent purchase price increases over time based on contingent bid submission, where, based on receiving a new contingent bid indicating a new highest contingent price, the upward-going contingent purchase price is raised up to a new price, i.e. the new highest contingent price of the new contingent bid. Meanwhile, a prospective buyer who submitted the contingent bid that indicated the previous highest contingent price can be notified that the prospective buyer has been outbid by another prospective buyer who submitted the new contingent bid indicating the new highest contingent price.

Figure 2B:
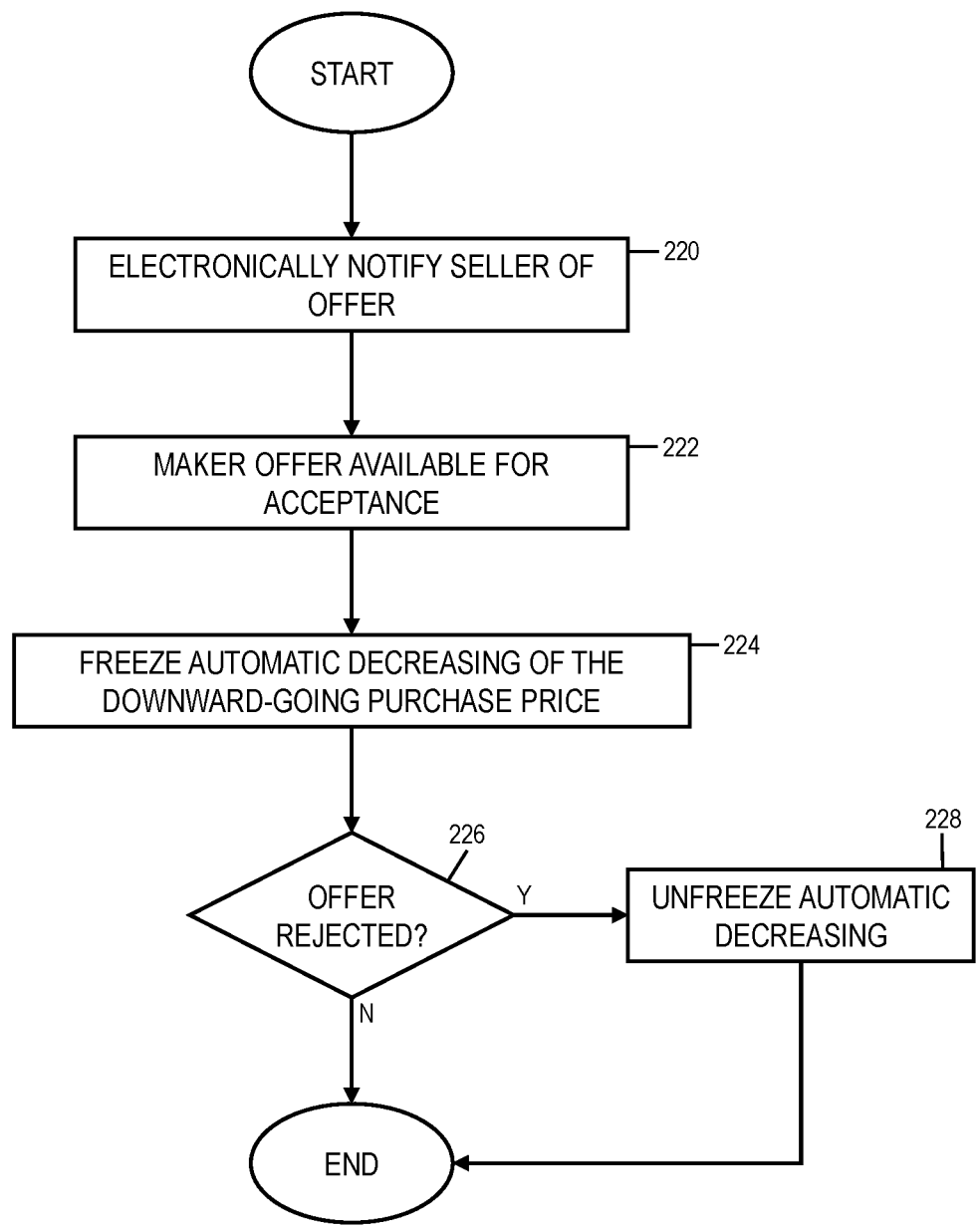
Figure 2C:
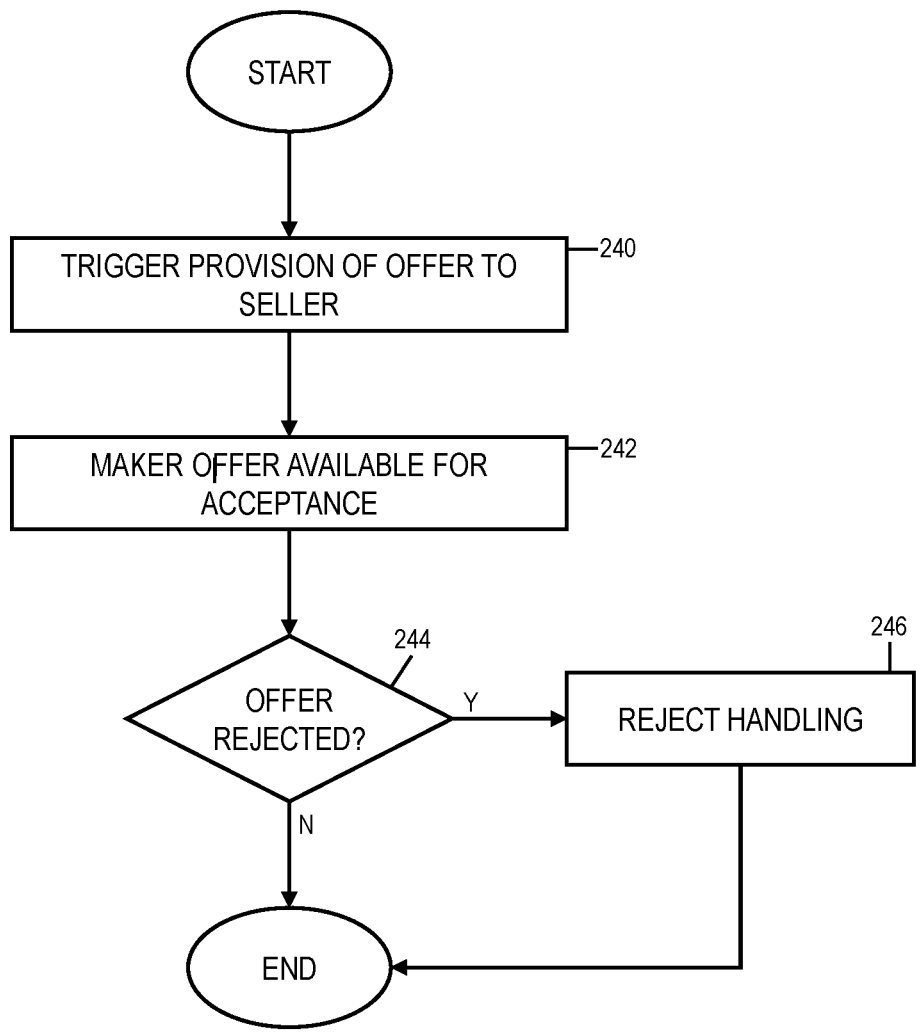

Returning back to the description of FIG. 2A, the process continues with further processing based on whether an offer is submitted, for instance based on an immediately-effective offer to purchase the lot at the downward-going purchase price being submitted or based on automatic triggering of an offer to purchase the lot at the upward-going contingent purchase price (i.e. if the downward-going purchase price and the upward-going contingent purchase price converge). In the former situation, processing of FIG. 2B is invoked, while in the latter situation, processing of FIG. 2C is invoked. Thus, the process of FIG. 2A proceeds by determining (210) whether an offer to purchase exists, for instance determining if an immediately-effective offer to purchase the lot at the downward-going purchase price was submitted by a prospective buyer and/or determining that an offer to purchase the lot at the upward-going contingent purchase price has been triggered. If so (210, Y), the process proceeds to process ((212) the offer. As noted, process the offer can proceed according to FIG. 2B or 2C.

FIG. 2B presents example processing based on submission of an immediately-effective offer (e.g. buy-now offer) at the then-current downward-going purchase price. This can be invoked based on selection, by a prospective buyer at a point in time, of an online auction web interface element (such as a button, e.g. 144 of FIG. 1) to effect submission of the immediately-effective offer to purchase the lot at the downward-going purchase price. The process electronically notifies (220) the seller of the submission of the immediately-effective offer to purchase the lot at the downward-going purchase price, and makes (222) the submitted immediately-effective offer to purchase the lot at the downward-going purchase price available for acceptance by the seller to sell the lot at the price reflected by the downward-going purchase price at the point in time of the selection of the web interface element. This immediately opens the offer up to acceptance.

The process also at least temporarily freezes (224) the automatic decreasing of the downward-going purchase price pending further processing of the submitted immediately-effective offer to purchase the lot at the downward-going purchase price. Pausing the pri$ometr decrease may be useful to prevent further decrease pending an outcome of this offer, i.e. it is accepted or rejected. If the offer is ultimately rejected but only after some significant passage of time, this may result in the pri$ometr decreasing undesirably low while other buyers may not be able to exercise the buy-now option during that time on account of the offer pending acceptance.

The process inquires at 226 whether the offer has been rejected. A seller may or may not be given an option to reject an offer. The seller (or a system on behalf of the seller) might reject an offer if a buyer is determined to be unqualified, for instance. If the offer is rejected (226, Y), for instance the rejection is received from the seller, then the process unfreezes (228) the automatic decreasing of the downward-going purchase price to effectively resume the auction including the automatic decrease of the downward-going purchase price. Then, or if the offer is not rejected but instead accepted (226, N), the process ends (for instance by returning an accept or reject result to FIG. 2A).

FIG. 2C presents example processing based on automatic triggering of an offer to purchase the lot at the upward-going contingent purchase price. This occurs automatically if/when the downward-going price decreases to converge with the upward-going contingent purchase price. Based on the on convergence of the downward-going purchase price and the upward-going contingent purchase price in which the downward-going purchase price automatically decreases to the upward-going contingent purchase price, the process automatically triggers (240) provision of the offer to purchase the lot at the upward-going purchase price. This provision of the offer includes electronically notifying the seller of the offer to purchase the lot at the upward-going purchase price. The process also makes (242) the offer to purchase the lot at the upward-going purchase price available for acceptance by the seller to sell the lot at the price reflected by the upward-going purchase price. The process could optionally (not indicated) at least temporarily freeze the downward-going purchase price pending offer acceptance.

The process also inquires at 244 whether the offer has been rejected, and if so (244, Y) invokes reject handling (246). Reject handling could include any appropriate handling of the offer, though in one example includes offering the lot to the next-highest contingent bidder. Additionally, if the downward-going purchase price were frozen, it could be unfrozen upon offer rejection. After reject handling (246), or if the offer was not rejected and instead was accepted (244, N), the process ends (for instance by returning an accept or reject result to FIG. 2A).

Returning to FIG. 2A, processing the offer (212) results in an accept or reject indication. If the offer is rejected, the process proceeds to inquire (at 214) whether the auction has expired. If the auction has not expired (214, N), it remains active and the process continues, for instance by returning to 202. Otherwise, if the auction has expired (214, Y) or if the offer has been accepted, the auction ends as does the process of FIG. 2A.

In some examples, the process assesses a penalty fee to the seller for rejecting an otherwise valid offer based on the seller rejecting the immediately-effective offer to purchase the lot at the downward-going purchase price or the offer to purchase the lot at the upward-going contingent purchase price.

Additionally or alternatively, in situations where the auction expires, for instance based on auction time-out or based on the downward-going purchase price decreasing to below some reserve price, for instance one that is seller-set or system set automatically, then an offer could be automatically presented to the seller, on behalf of the then-winning contingent bidder, indicating the then-current (as of auction expiration) upward-going contingent purchase price. The seller could then accept or reject that offer, despite it being lower than the seller's set reserve price.

As part of maintaining the upward-going contingent purchase price, in some examples it is included for display in the online auction web interface presented to prospective buyers, for instance as is depicted in FIG. 1. In other embodiments, it is maintained in secret from the seller and at least one of the other prospective buyers. This may be done at least until the downward-going purchase price automatically decreases to the upward-going contingent purchase price. Additionally, if a prospective buyer selects to submit a contingent bid, for instance by clicking to place a contingent/snypr bid, the upward-going contingent purchase price could then be displayed for that prospective buyer and indicate that the prospective buyer must exceed that upward-going contingent purchase price to submit a contingent bid. Thus, the example of FIG. 1 may be modified such that the current high bid (152) is not displayed in the listing 120 but is only displayed after a prospective buyer (who the system might verify based on account sign-in is not the seller of this lot) selects to submit a contingent bid.

In any case, as part of displaying the upward-going contingent purchase price to any prospective bidder, either in the general public listing 120 or after the prospective buyer selects to submit a contingent bid, a display color of the upward-going contingent purchase price can be selected based on whether the upward-going contingent purchase price equals or exceeds a seller-set reserve minimum price at which the lot is to be sold. Based on the upward-going contingent purchase price equaling or exceeding the seller-set reserve minimum price, the display color of the upward-going contingent purchase price is different than if the upward-going contingent purchase price were less than the seller-set reserve minimum price.

In another embodiment, a method for managing an online auction includes maintaining a downward-going purchase price at which prospective buyers of the lot can submit an immediately-effective offer to purchase the lot, automatically decreasing the downward-going purchase price during a time when the online auction remains active, and maintaining, concurrent with the maintaining the downward-going purchase price and the automatically decreasing the downward-going purchase price, an upward-going contingent purchase price at which an offer to purchase the lot may be automatically triggered for provision on behalf of an identified buyer to the seller. In this embodiment, the offer may be provided after a bid-off triggered based on convergence of the downward-going purchase price and upward-going contingent purchase price. The method can receiving one or more contingent bids submitted by a respective one or more prospective buyers of the lot, with each contingent bid of the one or more contingent bids indicating a respective contingent price lower than the downward-going purchase price, and. Based on receiving these one or more contingent bids, the method identifies a contingent bid, of the received one or more contingent bids, indicating a highest contingent price of the received one or more contingent bids; and sets the upward-going contingent purchase price based at least in part on that highest contingent price. The method can perform processing based on (i) submission of an immediately-effective offer to purchase the lot at the downward-going purchase price or (ii) convergence of the downward-going purchase price and the upward-going contingent purchase price. In situations where convergence occurs, a bid-off could be triggered automatically or it could first be determined whether to trigger a bid-off, for instance based on the highest contingent bid having been received within some configurable amount of time. If a bid-off is triggered, a timeframe may be opened for bidders to submit contingent bids. The bidders invited to engage in the bid-off by submitting a contingent bid may be limited to those who submitted the latest contingent bids, for instance the last 2, 3, or any other number of contingent bids. Alternatively, any bidder who submitted a contingent bid might be invited to submit a contingent bid during the bid-off. The bid-off ends at lapse of the timeframe and an offer is automatically provided to the seller. The offer could be for the price of the highest submitted contingent bid, whether it was the original contingent bid at which the convergence occurred (i.e. no higher bids were received during the bid-off) or a higher contingent bid, i.e. one received during the bid-off.

In yet additional embodiments, a computer-implemented method is provided that presents a graphical user interface (GUI) to a user. Presentation of a GUI encompasses (i) server-side processing and steps to build the program code and data implementing the GUI or aspects thereof to send to a client device, (ii) conveyance of such program code/data by any device between the server and client, and/or (iii) client-side displaying/rendering the GUI in a web browser or other software/application ("app"), as examples.

The GUI can include an online auction web interface through which prospective buyers interact with a listing web server. An example such interface is depicted and described with reference to FIG. 1 and elsewhere herein. The online auction web interface presents an online auction that includes a listing placed and drafted by a seller of a lot for purchase. In examples, the online auction web interface includes a first interface element presenting a downward-going purchase price at which prospective buyers of the item can submit an immediately-effective offer to purchase the lot. An example such first interface element is 142 of FIG. 1, indicating the buy-now price. The downward-going purchase price automatically decreases during a time when the online auction remains active, and, based on the downward-going purchase price automatically decreasing, the presenting of that first interface element as part of presenting the GUI updates/refreshes the first interface element, as the downward-going purchase automatically decreases, to reflect the automatically-decreasing downward-going purchase price. In this regard, the element could continually update to reflect the continually-decreasing downward-going purchase price.

The online auction web interface can further include a user-interactive second interface element that is configured for selection by the user to submit an immediately-effective offer to purchase the lot. An example such second interface element is element 144 of FIG. 1. The element can be configured such that if the user selects the element this causes a communication to the server which effects and submits an offer at the then-current downward-going price.

The online auction web interface can further include a user-interactive third interface element that is configured for selection by the user to initiate submission of a contingent bid having a contingent price, lower than the downward-going purchase price. An example such third interface element is element 154 of FIG. 1. The element can be configured such that it causes the interface to then present an element/interface for the user to input/specify a contingent price.

User selection of the second interface element to submit the immediately-effective offer to purchase the lot can cause the server to at-least-temporarily freeze the automatic decreasing of the downward-going purchase price pending further processing of the submitted immediately-effective offer to purchase the lot at the downward-going purchase price. Thus, user selection can communicate to the server an electronic communication that triggers the freeze on the server end, which is effected in the form of an interface update to cause the user's interface to freeze the decrease in the downward-going price.

Additionally or alternatively (and potentially after the user selects the third interface element), the online auction web interface can further include:
   (i) a user-interactive fourth interface element that includes an input interface to specify the contingent price of the contingent bid. An example such fourth interface element is a slider, button, or input box/field for the user to select/input a contingent price. As noted, this may be forced to exceed the existing upward-going contingent purchase price;
   a fifth interface element displaying the upward-going contingent purchase price at which an offer to purchase the lot is to be automatically triggered for provision on behalf of an identified buyer to the seller contingent on the downward-going purchase price decreasing to the upward-going contingent purchase price. An example such fifth interface element is the current high bid (152 of FIG. 1), which is the current snypr price and is what any other contingent bid must exceed; and
   a user-interactive sixth interface element that is configured for selection by the user to submit to the listing web server the contingent bid, including the contingent price, for acceptance (of the bid) if the contingent price of the contingent bid exceeds the upward-going contingent purchase price. An example such sixth interface element is a submission button that the user clicks to submit the contingent bid to the server.

In some embodiments, the downward-going purchase price decreases according to a pre-established function based at least in part on passage of time, and at a frequency of at least once per second. Presenting the first interface element can update the first interface element at that frequency (or faster) to thereby reflect each such decrease in the downward-going purchase price.

As discussed above, many auction galleries, whether physical or online, still utilize the traditional Old English auction model where items/lots are reviewed by the house specialist, packed up for shipment at the seller's location, shipped and transported to a central auction gallery, unloaded, warehoused, photographed, and catalogued, after which the catalogue is uploaded onto a sale site with potentially hundreds of other item/lots from that individual auction gallery for their specific sales. An auction commences at a preset, certain future date and time, starting with the first lot of the auction. The items/lots are offered in a lot-numbered sequence over a course of potentially many hours. The bidding progresses from a low opening bid. A lot either sells or is withdrawn based a "secret reserve" price not being met. All of these various overhead costs, plus site fees and promotion for each individual sale/lot take a substantial investment in personnel, facility, etc., and create a substantial monetary overhead. Commissions must therefore be high. Commissions/premiums being imposed upon both buyer and seller can often cumulatively exceed 50% percent in total. While this might be acceptable for high-profile market offerings where the ability to research and authenticate expensive works is important and adds value, it may not be for the vast majority of lots to be auctioned. In contrast, and in accordance with aspects described herein, the individual item/lots are processed and catalogued at the owner's/seller's site, where they remain there until shipped to the buyer. Possessions offered for sale can be photographed and described on the auction platform by the seller/owner (who likely knows more about the item/lot to be offered than most gallery personnel), they remain at the owner's location until paid-for, and are then shipped directly to the buyer under the owner's direction after payment is secured by the auction platform.

Implementations of English-style auctions are neither dealer nor consumer-friendly. They can be an obscure, financially hazardous, hard to navigate landscape for the buying public and even for experienced sellers, and are not comfortable, cost effective, or user friendly. The English protocol for conducting an auction sale is now hundreds of years ole and was only awkwardly adapted for the internet.

From a buyer's perspective auctions tend to be costly, time consuming, non-secure, and non-transparent. Standard auction processes can be cumbersome and time consuming, requiring patience, studying, time, and work. Buyers often see inaccurate, sparse lot descriptions created by an auction house staff member who may or may not be proficient in describing the item/lot. Auction catalogs and listings vary widely in quality and no auction house provides real experts with expertise in every type of item/lot that is presented for sale. Insecurity results when a buyer has to rely on an auctioneer's description and estimated value of the item/lot described. Additionally, a potential buyer may need to keep track and follow the item/lot for days or weeks before the unpredictable moment that the item/lots are actually on "the block". It can be near-impossible to predict at what time bidding on a given lot will begin, and it might on the final date, especially with auctions of larger sale offerings. Meanwhile, buyers often do not know when in competition whether they are bidding against any real bidder or against the house. In conventional auctions, there is substantial cost and risks of damages from shipping and handling since the item/lot is transported and stored at the auction house while awaiting processing, and only after sale does the item undergo another transport/ship to the buyer. Furthermore, existing approaches can be very costly for participants, with cumulative fees incurred by the buyer alone that could reach over 30% over the successful bid price.

From a seller's perspective, auctions can be uncertain, time consuming, costly, and non-transparent. The auction commission structure often consumes over 50% of the total price paid. The seller customarily must pay to ship the item/lot to the auction, pay for insurance while it is there, and cover any damage from the time it leaves the seller until it reaches the auction block and eventually the buyer. The process from start to payment can take many months, and the item/lot is out of the owner's possession during this time. They do not have the option of selling the item during that period. Additionally, the seller does not have control of the marketing or description of their lots, and of their placement in the auction. And because a substantial percentage (sometimes 25-50%) of items/lots offered do not sell, the seller may have to retrieve the now-diminished, exposed item/lot at further cost and will often be assessed fees in such a case. Because current protocols utilized for auctioneering are so time consuming and problematic, the general buying public is not as active in the marketplace as they might be, competition on many item/lots is lacking, and many item/lots remain unsold after the sale is conducted These issues are even more financially problematic and stressful for those in the trade. Dealers face pressures to turn over their inventory. The risks, time factors and high cost of doing business under the current structures offer no avenue for liquidity in the markets.

In addition to opening up new potential market access for individuals and smaller businesses, aspects also open up new fundraising potentials for not-for-profits. Many doors that were previously open for not for-profit fundraising have now become more limited. Fundraising dinners and traditional fundraising auctions are no longer as available for potential fundraising activities. However, in accordance with aspects described herein, providing these offerings is separate lower auctions would make them extremely cost effective and an easily-accessible potential for not-for-profit fundraising.

Although various examples are provided, variations are possible without departing from a spirit of the claimed aspects.

Figure 4:
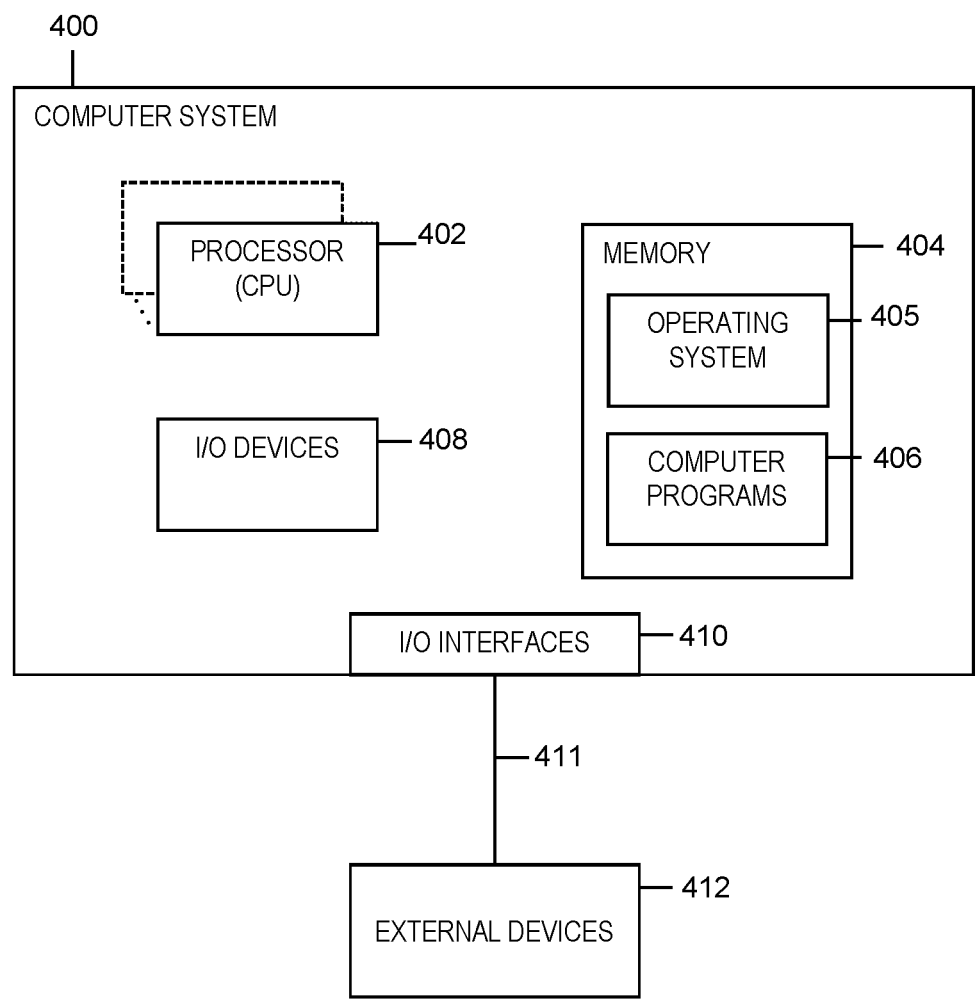
FIG. 4 depicts one example of a computer system and associated devices to incorporate and/or use aspects described herein.

Processes described herein may be performed singly or collectively by one or more computer systems, such as one or more auction servers, as examples. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by Intel Corporation (Santa Clara, Calif., USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects of the present invention may be a system, a method, and/or a computer program product, any of which may be configured to perform or facilitate aspects described herein.

In some embodiments, aspects of the present invention may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C#, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method for managing an online auction by an auction server, the online auction comprising a listing placed and drafted by a seller of a lot for purchase, the method comprising:
   providing, in a graphical user interface, a first interface element that presents a first purchase price at which prospective buyers of the lot can submit, via a second interface element provided in the graphical user interface, an immediately-effective offer to purchase the lot;
   automatically decreasing the first purchase price during a time when the online auction remains active, and updating the first interface element to present the decreasing first purchase price;
   providing, in the graphical user interface, at least one third interface element for bid submission including input of an offered price;
   receiving, by the auction server, via the at least one third interface element, one or more bids, wherein each bid of the one or more bids is submitted electronically and communicated via the Internet to the auction server from a respective client computer system, and wherein each bid of the one or more bids comprises an offered price that is lower than the first purchase price;
   setting a second purchase price based on the received one or more bids, wherein the second purchase price is a price at which an offer to purchase the lot is to be automatically triggered for provision to the seller based on the first purchase price decreasing to the second purchase price, wherein the setting is performed each time each bid of the one or more bids is received, and comprises raising the second purchase price to be the offered price of the bid, wherein the setting necessarily increases the second purchase price with receipt of each bid of the one or more bids, and in real-time as each bid of the one or more bids is received;
   providing in the graphical user interface a fourth interface element that presents the second purchase price, and updating the fourth interface element each time the second purchase price is raised on the setting the second purchase price;
   performing processing to electronically communicate, from the auction server to a seller computer system via the Internet, an offer for potential seller acceptance based on (i) submission of an immediately-effective offer to purchase the lot at the first purchase price or (ii) automatic triggering of an offer to purchase the lot at the second purchase price, the automatic triggering being based on convergence of the first purchase price and the second purchase price; and
   at least temporarily freezing the automatic decreasing of the first purchase price pending further processing of the offer for potential seller acceptance, and updating the first interface element to display a frozen first purchase price while the first purchase price remains at least temporarily frozen pending the further processing of the offer for potential seller acceptance.

2. The method of claim 1, wherein the offer for potential seller acceptance is the immediately-effective offer to purchase the lot at the first purchase price, and wherein the processing to electronically communicate the offer for potential seller acceptance comprises, based on selection of the second interface element to effect submission of the immediately-effective offer to purchase the lot at the first purchase price:
   electronically notifying the seller of the submission of the immediately-effective offer to purchase the lot at the first purchase price; and
   making the submitted immediately-effective offer to purchase the lot at the first purchase price available for acceptance by the seller to sell the lot at the price reflected by the first purchase price at the point in time of the selection of the second interface element.

3. The method of claim 2, wherein the further processing comprises receiving from the seller a rejection of the immediately-effective offer to purchase the lot at the first purchase price, and wherein the method further comprises, based on the seller rejecting the immediately-effective offer to purchase the lot at the first purchase price, unfreezing the automatic decreasing of the first purchase price, wherein the unfreezing causes a resume of the automatic decrease of the first purchase price and further updating the first interface element to resume presentation of the decreasing first purchase price.

4. The method of claim 1, wherein the offer for potential seller acceptance is the offer to purchase the lot at the second purchase price, and wherein the processing to electronically communicate the offer for potential seller acceptance comprises, based on convergence of the first purchase price and the second purchase price, in which the first purchase price automatically decreases to the second purchase price:

automatically triggering provision of the offer to purchase the lot at the second purchase price, the provision comprising electronically notifying the seller of the offer to purchase the lot at the second purchase price; and making the offer to purchase the lot at the second purchase price available for acceptance by the seller to sell the lot at the price reflected by the second purchase price.

5. The method of claim 1, wherein the automatically decreasing the first purchase price comprises decreasing the first purchase price according to a pre-established function based at least in part on passage of time.

6. The method of claim 5, wherein the decreasing the first purchase price according to the pre-established function comprises decreasing the first purchase price at a frequency of at least once per second, wherein the first purchase price presented in the first interface element is updated at the frequency, or faster, to thereby reflect each such decrease in the first purchase price.

7. The method of claim 1, wherein the one or more bids comprises a plurality of bids, the plurality of bids comprising a first bid having a first offered price and a second bid having a second offered price that is higher than the first offered price, and wherein the method comprises, based on receiving the second bid and raising the second purchase price from the first offered price to the second offered price, notifying a prospective buyer who submitted the first bid.

8. The method of claim 1, further comprising ending the online auction based on acceptance, by the seller, of the offer for potential seller acceptance, the offer for potential seller acceptance being the immediately-effective offer to purchase the lot at the first purchase price or the offer to purchase the lot at the second purchase price.

9. The method of claim 1, further comprising maintaining the second purchase price in secret from the seller until the first purchase price automatically decreases to the second purchase price, and wherein, and based on a prospective buyer selecting to submit a bid of the one or more bids at a point in time, the second purchase price at that point in time is displayed for the prospective buyer indicating that the offered price of the bid to be submitted by the prospective buyer must exceed that second purchase price at that point in time in order for the bid to be accepted.

10. The method of claim 9, wherein, as part of displaying the second purchase price to the prospective buyer, a display color of the second purchase price is selected based on whether the second purchase price equals or exceeds a seller-set reserve minimum price at which the lot is to be sold, wherein based on the second purchase price equaling or exceeding the seller-set reserve minimum price, the display color of the second purchase price is different than if the second purchase price were less than the seller-set reserve minimum price.

11. The method of claim 1, further comprising assessing a penalty fee to the seller based on the seller rejecting the offer for potential seller acceptance, the offer for potential seller acceptance being the (i) the immediately-effective offer to purchase the lot at the first purchase price or (ii) the offer to purchase the lot at the second purchase price.

12. The method of claim 1, wherein the online auction is configured to expire based on the first purchase price decreasing to a seller-set reserve price, and wherein the method further comprises presenting to the seller, upon expiration of the online auction, an offer for purchase of the lot at the second purchase price.

13. A computer system for managing an online auction, the online auction comprising a listing placed and drafted by a seller of a lot for purchase, the computer system comprising:

a memory; and a processor in communication with the memory, wherein the computer system is configured to perform a method comprising:

providing, in a graphical user interface, a first interface element that presents a first purchase price at which prospective buyers of the lot can submit, via a second interface element provided in the graphical user interface, an immediately-effective offer to purchase the lot;

automatically decreasing the first purchase price during a time when the online auction remains active, and updating the first interface element to present the decreasing first purchase price;

providing, in the graphical user interface, at least one third interface element for bid submission including input of an offered price;

receiving, by the auction server, via the at least one third interface element, one or more bids, wherein each bid of the one or more bids is submitted electronically and communicated via the Internet to the auction server from a respective client computer system, and wherein each bid of the one or more bids comprises an offered price that is lower than the first purchase price;

setting a second purchase price based on the received one or more bids, wherein the second purchase price is a price at which an offer to purchase the lot is to be automatically triggered for provision to the seller based on the first purchase price decreasing to the second purchase price, wherein the setting is performed each time each bid of the one or more bids is received, and comprises raising the second purchase price to be the offered price of the bid, wherein the setting necessarily increases the second purchase price with receipt of each bid of the one or more bids, and in real-time as each bid of the one or more bids is received;

providing in the graphical user interface a fourth interface element that presents the second purchase price, and updating the fourth interface element each time the second purchase price is raised based on the setting the second purchase price;

performing processing to electronically communicate, from the auction server to a seller computer system via the Internet, an offer for potential seller acceptance based on (i) submission of an immediately-effective offer to purchase the lot at the first purchase price or (ii) automatic triggering of an offer to purchase the lot at the second purchase price, the automatic triggering being based on convergence of the first purchase price and the second purchase price; and at least temporarily freezing the automatic decreasing of the first purchase price pending further processing of the offer for potential seller acceptance, and updating the first interface element to display a frozen first purchase price while the first purchase price remains at least temporarily frozen pending the further processing of the offer for potential seller acceptance.

14. The computer system of claim 13, wherein the offer for potential seller acceptance is the immediately-effective offer to purchase the lot at the first purchase price, and wherein the processing to electronically communicate the offer for potential seller acceptance comprises, based on selection of the second interface element to effect submission of the immediately-effective offer to purchase the lot at the first purchase price:

electronically notifying the seller of the submission of the immediately-effective offer to purchase the lot at the first purchase price; and making the submitted immediately-effective offer to purchase the lot at the first purchase price available for acceptance by the seller to sell the lot at the price reflected by the first purchase price at the point in time of the selection of the second interface element.

15. The computer system of claim 13, wherein the offer for potential seller acceptance is the offer to purchase the lot at the second purchase price, and wherein the processing to electronically communicate the offer for potential seller acceptance comprises, based on convergence of the first purchase price and the second purchase price, in which the first purchase price automatically decreases to the second purchase price:

automatically triggering provision of the offer to purchase the lot at the second purchase price, the provision comprising electronically notifying the seller of the offer to purchase the lot at the second purchase price; and making the offer to purchase the lot at the second purchase price available for acceptance by the seller to sell the lot at the price reflected by the second purchase price.

16. The computer system of claim 13, further comprising maintaining the second purchase price in secret from the seller until the first purchase price automatically decreases to the second purchase price, and wherein, based on a prospective buyer selecting to submit a bid of the one or more bids at a point in time, the second purchase price at that point in time is displayed for the prospective buyer indicating that the offered price of the bid to be submitted by the prospective buyer must exceed that second purchase price at that point in time in order for the bid to be accepted.

* * * * *